US007636380B2

(12) United States Patent
Yao et al.

(10) Patent No.: US 7,636,380 B2
(45) Date of Patent: Dec. 22, 2009

(54) ORTHOGONAL PULSE POLARITY MODULATION

(75) Inventors: Richard Yuqi Yao, Morris Plains, NJ (US); Zihua Guo, Beijing (CN); Weiyu Xu, Ithaca, NY (US); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 605 days.

(21) Appl. No.: 10/847,259

(22) Filed: May 17, 2004

(65) Prior Publication Data

US 2005/0254553 A1     Nov. 17, 2005

(51) Int. Cl.
*H04B 1/00*     (2006.01)

(52) U.S. Cl. .................... 375/130; 375/260; 375/272; 375/285; 375/343; 375/367; 455/42; 370/203

(58) Field of Classification Search ................. 375/130
See application file for complete search history.

(56) References Cited

U.S. PATENT DOCUMENTS

| 6,603,818 | B1* | 8/2003 | Dress et al. | 375/295 |
| 7,099,366 | B2* | 8/2006 | Umeno | 375/130 |
| 7,187,715 | B2* | 3/2007 | Balachandran et al. | 375/242 |
| 2003/0165184 | A1* | 9/2003 | Welborn et al. | 375/146 |
| 2004/0141548 | A1* | 7/2004 | Shattil | 375/146 |
| 2004/0240527 | A1* | 12/2004 | Giannakis et al. | 375/138 |
| 2005/0013345 | A1* | 1/2005 | Choi | 375/130 |
| 2005/0041746 | A1* | 2/2005 | Rosen et al. | 375/242 |
| 2005/0117557 | A1* | 6/2005 | Lakkis | 370/338 |
| 2005/0195883 | A1* | 9/2005 | Choi et al. | 375/130 |
| 2005/0220172 | A1* | 10/2005 | Mo et al. | 375/130 |
| 2005/0220173 | A1* | 10/2005 | Zyren et al. | 375/130 |
| 2006/1014024 | * | 6/2006 | Kohno | 375/130 |

OTHER PUBLICATIONS

Ramirez-Mireles, et al.; "Performance of Equicorrelated Ultra-Wideband Pulse-Position-Modulated Signals in the Indoor Wireless Impulse Radio Channel"; IEEE Pacific Rim Conference on Communications, Computers and Signal Processing, vol. 2, pp. 640-644; 1997.
Eshima, et al; "M-ary UWB System Using Walsh Codes"; Digest of Papers, IEEE Conference on Ultra Wideband Systems and Technology; pp. 37-40; May 2002.
Buehrer, er al.; "Range Extension for UWB Communications"; Virginia Tech, White Paper; May 30, 2002; http://filebox.vt.edu/users/nikumar/.

(Continued)

*Primary Examiner*—Shuwang Liu
*Assistant Examiner*—Kenneth Lam
(74) *Attorney, Agent, or Firm*—Lee & Hayes, PLLC

(57) ABSTRACT

Orthogonal pulse polarity modulation involves wireless communication in which the polarity of modulating pulses are set responsive to positive and negative character values of a corresponding code sequence. In a described implementation, data is converted to chip waveforms, spectrum lines are removed, and pulses are appropriately shaped. For example, a data bit stream may be converted into chip waveforms using a bit stream-to-symbol segmenter, a symbol-to-code sequence mapper, and a code sequence-to-chip waveform transformer. The polarities of respective individual chips in a given chip waveform match the signs of respective individual characters in a corresponding code sequence.

23 Claims, 8 Drawing Sheets

OTHER PUBLICATIONS

Scholtz; "Multiple Access with Time-Hopping Impulse Modulation" IEEE Military Communications Conference: Communications on the Move; vol. 2; pp. 447-450; 1993.

Xu, et al., "A Power Efficient M-ary Orthogonal Pulse Polarity Modulation for TH-UWB System Using Modified OVSF Codes" GLOBECOM 2003, IEEE Global Telecommunications Conference Preceedings, San Francisco, CA, Dec. 1-5, 2003, pp. 436-440.

Shaomin S. Mo, "Phase Reversion to Reduce Power Spectral Density of Multi-band UWB Signals" Consumer Communications and Networking Conference, 2004, Las Vegas, NV, Jan. 5-8, 2004, pp. 307-311.

Sheng, et a.l, "On the Spectral and Power Requirements for Ultra-Wideband Transmission" IEEE International Conference on Communications, Anchorage, AK, 2003, May 11-15, 2003, pp. 738-742.

Stanley K. Ling, "TG3 PHY: Channel plan for high-rate WPAN" Jan 15, 2001, Available at URL:http://grouper.ieee.org/groups/802/15/pub/2001/Mar01/.

* cited by examiner

ORTHOGONAL PULSE POLARITY MODULATION

TECHNICAL FIELD

This disclosure relates in general to modulation schemes and techniques for wireless communications and in particular, by way of example but not limitation, to a power efficient orthogonal pulse polarity modulation ($OP^2M$) for ultra wideband (UWB) systems.

BACKGROUND

Ultra wideband (UWB) wireless communication has been the subject of significant research interest in recent years. In a traditional single-band UWB system, a series of pulses with very short duration, typically on the order of a nanosecond (ns) or less, is transmitted to convey data. UWB therefore holds great promise for high data rate wireless applications. However, because of the extremely short pulse width, the spectrum of a UWB signal often spans several Gigahertz (GHz), which can overlay bands of existing narrowband systems.

To be accepted for widespread applications with negligible interference to existing narrowband systems, UWB devices are required to meet a strict power spectrum density (PSD) constraint that is set by the Federal Communication Commission (FCC). Consequently, single-band UWB systems have some drawbacks. For example, it has been inefficient to utilize the whole UWB spectrum (e.g., 3.1 GHz to 10.6 GHz) while also meeting the FCC PSD constraints. In other words, conventional approaches do not enable full UWB spectrum use while concomitantly avoiding interference from and/or to narrowband systems (e.g., such as those operating in accordance with IEEE 802.11a).

In response to this deficiency of conventional approaches, a multi-band UWB system has been proposed. Specifically, a multi-band UWB system has been proposed in conjunction with IEEE 802.15.3a in a standards meeting therefor. In such a system, in contrast to the single-band UWB system, the whole UWB band is divided into multiple disjoint sub-bands. Each of the sub-bands occupies fractional bandwidth of the total UWB spectrum (3.1 GHz to 10.6 GHz). A carrier with a different centre frequency in each sub-band is modulated by a somewhat wider pulse (e.g., a pulse having a width of approximately 3 ns) during transmission.

Due to the strict FCC PSD constraints, UWB systems are power limited systems regardless of whether they are operated as single-band or multi-band systems. To reduce the impact of the power limitation on system range and/or data throughput, a power efficient UWB modulation scheme may be employed. Several modulation schemes for UWB systems have been proposed. These proposed schemes include: Pulse Amplitude Modulation (PAM) schemes and Pulse Position Modulation (PPM) schemes. PAM schemes include Binary Phase Shift Keying (BPSK) and On-Off Keying (OOK) modulation schemes. PPM schemes include an M-ary Equicorrelated (EC) PPM scheme, an M-ary PPM scheme using Walsh Codes, and an M-ary orthogonal PPM scheme. None of these proposed schemes, however, fully utilize the spectrum allocated to UWB systems while avoiding interference with narrowband systems.

Accordingly, there is a need for schemes and/or techniques that can modulate wireless communications in UWB systems in a power efficient manner.

SUMMARY

Orthogonal pulse polarity modulation involves wireless communication in which the polarity of modulating pulses are set responsive to positive and negative character values of a corresponding code sequence. In a described implementation, data is converted to chip waveforms, spectrum lines are removed, and pulses are appropriately shaped. For example, a data bit stream may be converted into chip waveforms using a bit stream-to-symbol segmenter, a symbol-to-code sequence mapper, and a code sequence-to-chip waveform transformer. The polarities of respective individual chips in a given chip waveform match the signs of respective individual characters in a corresponding code sequence.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
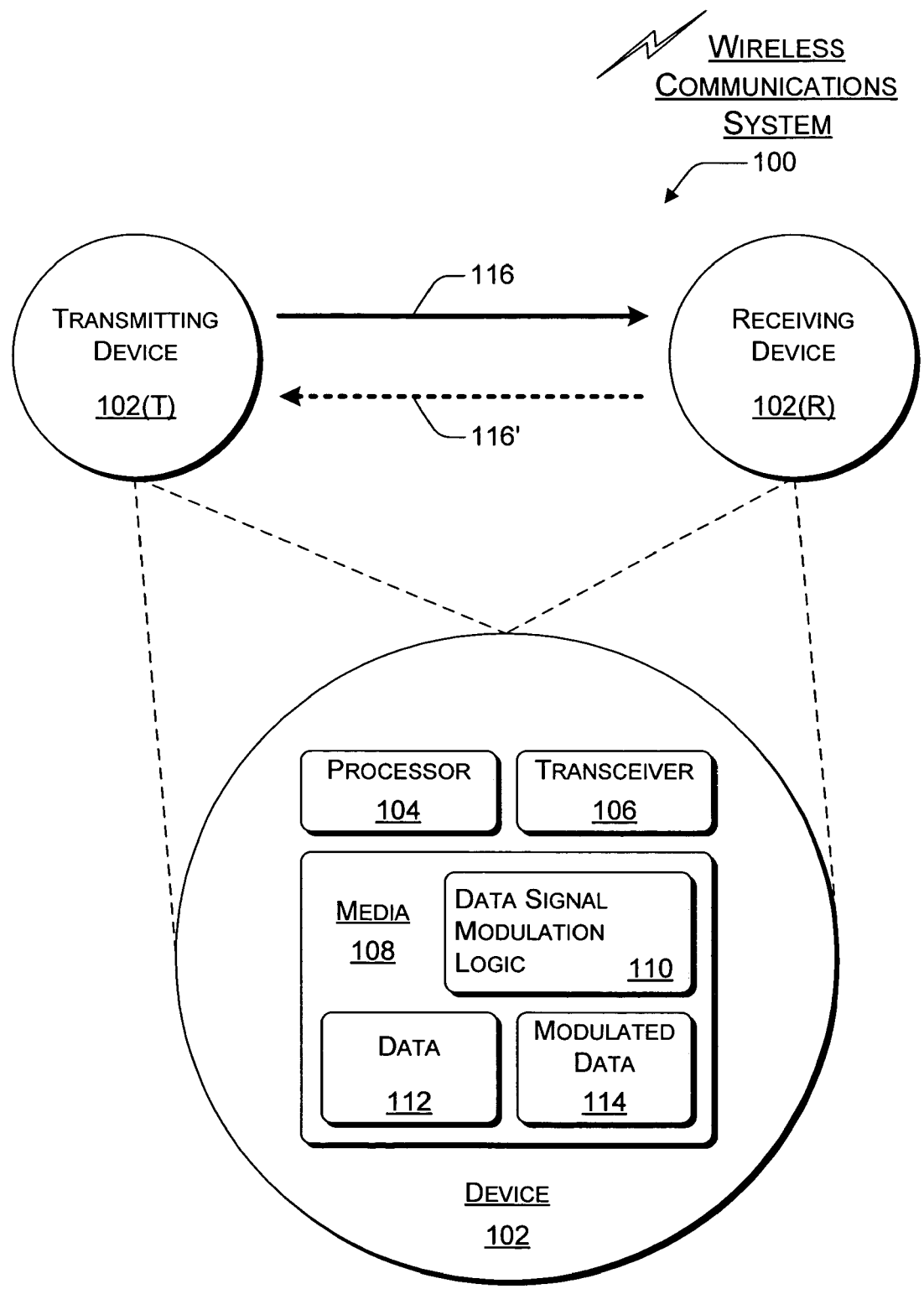
FIG. 1 is an exemplary wireless communications system formed from a transmitting device and a receiving device, and it illustrates exemplary components of a device, including data signal modulation logic.

Wireless Communication Systems and Introduction to Modulations for Ultra Wideband Wireless Communications FIG. 1 is an exemplary wireless communications system 100 formed from a transmitting device 102(T) and a receiving device 102(R), and it illustrates exemplary components of a device 102, including data signal modulation logic 110. In a described implementation, each device 102 is capable of forming a portion of a wireless network and/or participating in a wireless exchange. As illustrated, transmitting device 102(T) is transmitting a wireless communication or signal 116 toward receiving device 102(R), and receiving device 102(R) is receiving wireless communication 116.

Each device 102 may be similar to or different from each other device 102 in terms of size/shape, intended purpose, processing ability, programming, and so forth. For example, each device 102 may be a laptop computer, a mobile phone, a personal digital assistant (PDA), an input device, and so forth. Other exemplary realizations for devices 102 are described further below with reference to FIG. 8.

In a described implementation, each device 102 includes a processor 104, a transceiver 106, and media 108. Processor 104 is capable of executing, performing, and/or otherwise effectuating processor-executable instructions. A transmitter and/or receiver (i.e., a transceiver) 106 is capable of sending/transmitting wireless communication 116 from transmitting device 102(T). Transceiver 106 is also capable of receiving wireless communication 116 at receiving device 102(R). Similarly, as indicated by the dashed arrow 116', transceiver 106 is capable of transmitting wireless communication 116' from receiving device 102(R) and of receiving wireless communication 116' at transmitting device 102(T). Hence, each device 102 may act as a transmitting/source device 102(T) for wireless communications 116/116' and as a receiving/destination device 102(R).

Media 108 may be one or more processor-accessible media, such as a volatile/nonvolatile memory or a wireless/wired propagation channel. Media 108 includes processor-executable instructions that are executable by processor 104 to effectuate particular device 102 functions. Specifically, media 108 of device 102 includes data signal modulation logic 110.

More generally, data signal modulation logic 110 may comprise hardware, software, firmware, analog component(s), some combination thereof, and so forth. Additionally, for receiving functionality, data signal modulation logic 110 may include logic for demodulating wireless communications 116.

Media 108 also includes data 112 and modulated data 114. Application of data signal modulation logic 110 to data 112 results in modulated data 114, which is described further below with reference to FIG. 3 et seq. Additional exemplary components, aspects, etc. for devices 102 are described further below with reference to FIG. 8.

Figure 2:
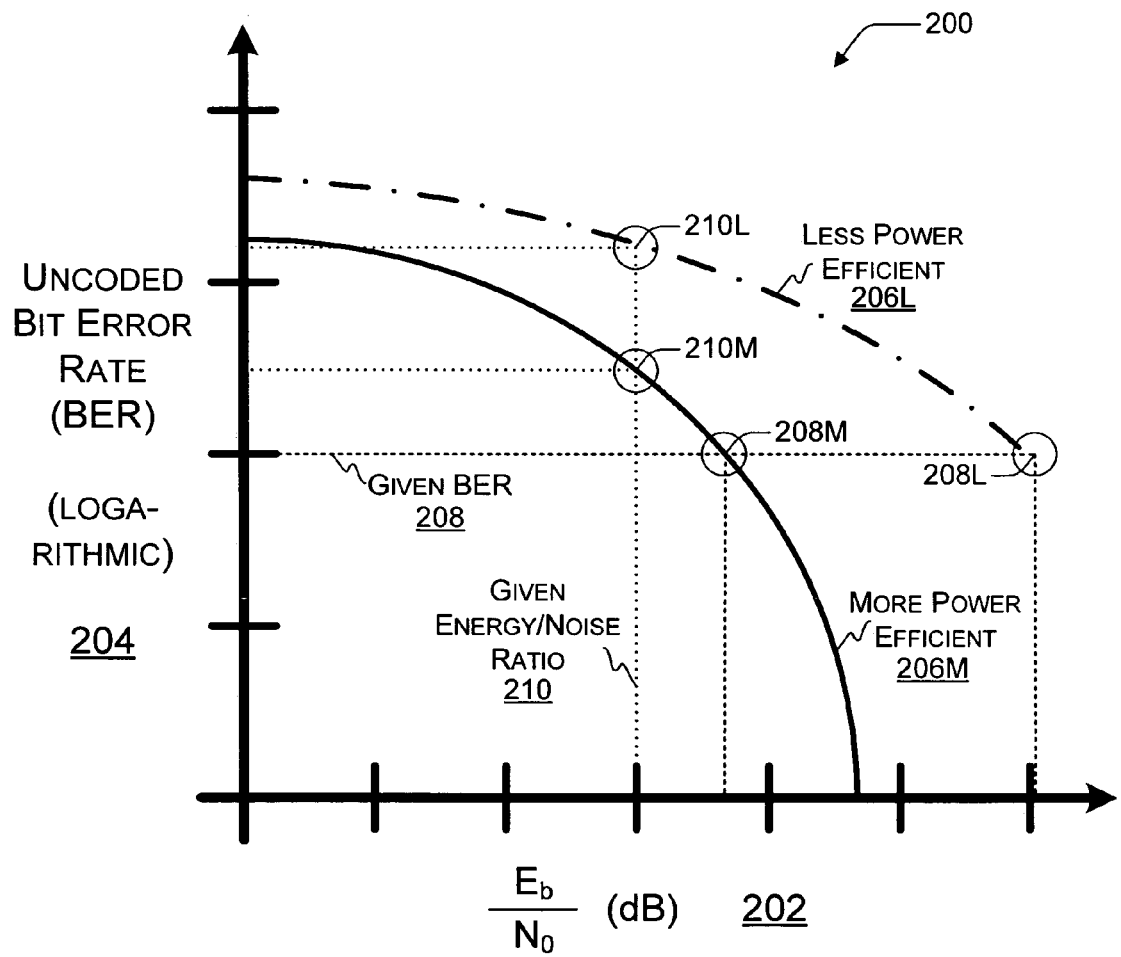
FIG. 2 is an exemplary graph of two curves that illustrate increased power efficiency with respect to bit error rate (BER) performance.

FIG. 2 is an exemplary graph 200 of two curves 206L and 206M that illustrate increased power efficiency with respect to bit error rate (BER) performance. In graph 200, energy-to-noise ratio ($E_b/N_O$) in decibels (dB) is plotted along the abscissa or "x" axis 202, and uncoded bit error rate (BER) in a logarithmic scale is plotted along the ordinate or "y" axis 204. A less power efficient curve 206L and a more power efficient curve 206M are both shown on graph 200.

To achieve a given BER level 208, a lower energy-to-noise ratio is required using modulation in accordance with the more power efficient curve 206M (as indicated by BER point 208M) as compared to the energy-to-noise ratio required using modulation in accordance with the less power efficient curve 206L (as indicated by BER point 208L). For a given energy-to-noise ratio level 210, modulation in accordance with the more power efficient curve 206M results in a lower BER (as indicated by energy-to-noise ratio point 210M) as compared to modulation in accordance with the less power efficient curve 206L (as indicated by energy-to-noise ratio point 210L).

Application of implementations of orthogonal pulse polarity modulation as described herein can produce more power efficient modulation of data signals for ultra wideband (UWB) wireless communications. In other words, as compared to other modulation schemes, a modulation scheme as described herein moves the corresponding power efficiency curve leftward (e.g., from the less power efficient curve 206L toward the more power efficient curve 206M).

As noted above, such other modulation schemes include: Pulse Amplitude Modulation (PAM) schemes and Pulse Position Modulation (PPM) schemes. PAM schemes include both Binary Phase Shift Keying (BPSK) and On-Off Keying (OOK) modulation schemes. PPM schemes include an M-ary Equicorrelated (EC) PPM scheme, an M-ary PPM scheme using Walsh Codes, and an M-ary orthogonal PPM scheme. Among these modulation schemes, binary PPM and BPSK are the most popular ones. BPSK is asserted by some to be the most power efficient among the binary UWB modulation schemes. Additionally, BPSK modulation is preferred over PPM for its relatively smoother signal from a power spectrum density (PSD) perspective for UWB systems.

Although M-ary EC-PPM and orthogonal PPM are usually more power efficient than BPSK when M is sufficiently large, both of their resulting modulated signals contain spectral lines that limit their performance under Federal Communications Commission (FCC) PSD-related rules. Furthermore, M-ary orthogonal PPM limits the number of time-hopping codes for multiple access and suffers more performance degradation in multipath and multiple access environments because of the high risk of confusing multipath and multiple access interfering pulses at corresponding time positions with actual modulated data pulses. M-ary EC-PPM is even less power efficient than M-ary orthogonal PPM in additive white Gaussian noise (AWGN) channels because of the non-orthogonality of its symbol set.

Due to the low power and wide bandwidth of a typical UWB signal, tens or hundreds of pulses are usually used to "harden" a single bit for BPSK or binary PPM UWB systems. All of these many pulses have the same polarity or pulse position shift. Consequently, it is possible to utilize pulse polarity that reflects polarity variations within a symbol to convey more information and thereby improve system performance, as is described herein below.

To achieve higher power efficiency and the desired signal PSD property for a UWB system, an M-ary Orthogonal Pulse Polarity Modulated (OP$^2$M) Time Hopping (TH) UWB system using modified Orthogonal Variable Spreading Factor (OVSF) codes is described. Although accepting bandwidth reduction in exchange for increased power efficiency is an unwise trade for narrowband systems because of their limited bandwidth resources, the use of high-order orthogonal modulation is well suited for UWB systems because UWB systems tend to have (much) larger bandwidth but limited power. A first aspect described below thus entails using orthogonal sequence codes to convert data to chip waveforms in which sign value information in the symbols is carried/encoded as polarity information in the chip waveforms.

A second aspect described below entails smoothing the PSD envelope by modifying the orthogonal sequence codes to balance the occurrence of negative and positive polarities in the orthogonal signal sets. A third aspect entails employing a tuned Gaussian pulse shaping mechanism. In a described implementation, the Gaussian pulse shaping obtains the largest receiving power under FCC PSD constraints.

As is shown below, the described M-ary OP$^2$M scheme is applicable to both single-band UWB systems and multi-band UWB systems. A qualitative description of orthogonal pulse polarity modulation is presented below with reference to FIGS. 3-6C. A quantitative description of orthogonal pulse polarity modulation is presented thereafter, including text referencing FIG. 7.

Qualitative Description of Orthogonal Pulse Polarity Modulation

Figure 3:
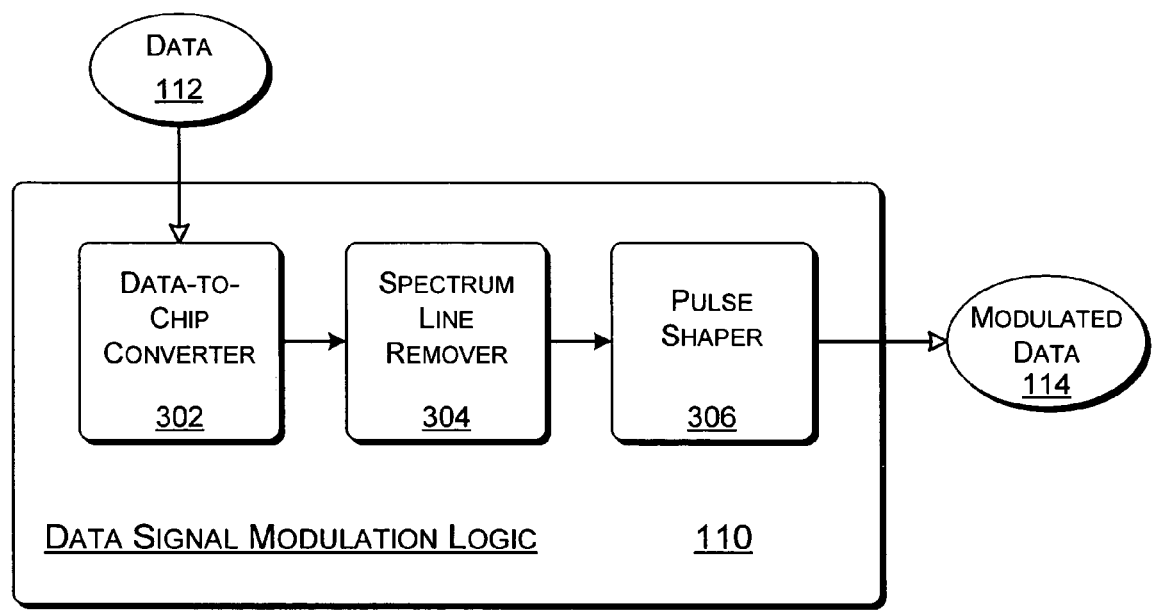
FIG. 3 illustrates exemplary data signal modulation logic, which includes a data-to-chip converter, a spectrum line remover, and a pulse shaper.

FIG. 3 illustrates exemplary data signal modulation logic 110, which includes a data-to-chip converter 302, a spectrum line remover 304, and a pulse shaper 306. Data signal modulation logic 110 accepts data 112 as input and produces modulated data 114 as output.

In a described implementation, data-to-chip converter 302 accepts data 112 as input and at least partially converts the data into a waveform using orthogonal code sequences. Any spectrum lines of the modulated waveform are removed by spectrum line remover 304. The pulses of the modulated signal are shaped by pulse shaper 306 so as to ensure that the modulated signal meets pertinent PSD constraint(s), such as an FCC imposed PSD constraint. After data-to-chip converter 302, spectrum line remover 304, and pulse shaper 306 have been applied to data 112, modulated data 114 is produced by data signal modulation logic 110. Although illustrated linearly, data-to-chip converter 302, spectrum line remover 304, and/or pulse shaper 306 may operate in any order, including in a partially or fully overlapping (e.g., simultaneous) manner.

Figure 4A:
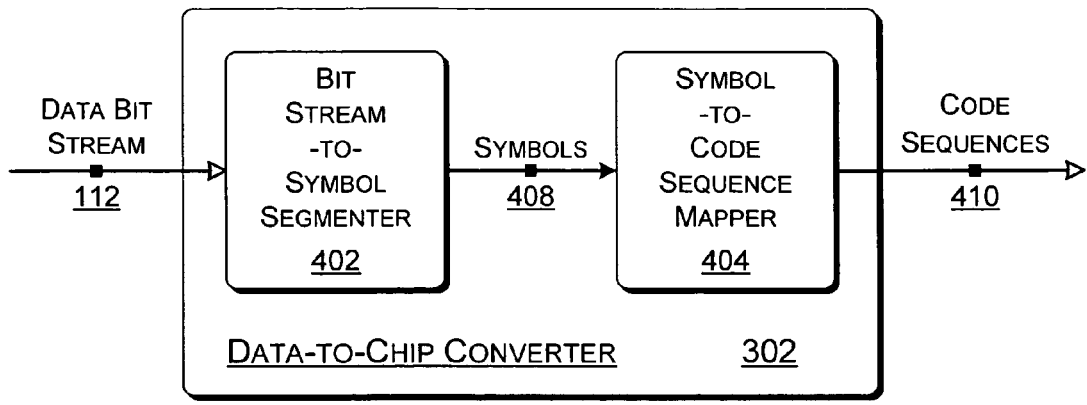
FIG. 4A is an exemplary data-to-chip converter.

FIG. 4A is an exemplary data-to-chip converter 302. Data-to-chip converter 302 accepts as input a data bit stream 112 and produces as output code sequences 410. As illustrated, data-to-chip converter 302 includes a bit stream-to-symbol segmenter 402 and a symbol-to-code sequence mapper 404.

In a described implementation, bit stream-to-symbol segmenter 402 accepts a binary data bit stream 112 as input and produces a series of symbols 408 as output. Symbols 408 are each of a length of "M" binary digits, where M may be a selected integer. Bit stream-to-symbol segmenter 402 provides the segmented symbols 408 to symbol-to-code sequence mapper 404.

Symbol-to-code sequence mapper 404 accepts as input each symbol 408 from bit stream-to-symbol segmenter 402. Symbol-to-code sequence mapper 404 maps each symbol 408 to a corresponding code sequence 410. Each symbol 408 maps to one of $2^M$ orthogonal code sequences 410. Each code sequence 410 has a length of $2^M$ characters. Symbol-to-code sequence mapper 404 provides the mapped code sequences 410 to pulse shaper 306 (of FIG. 3).

Figure 4B:
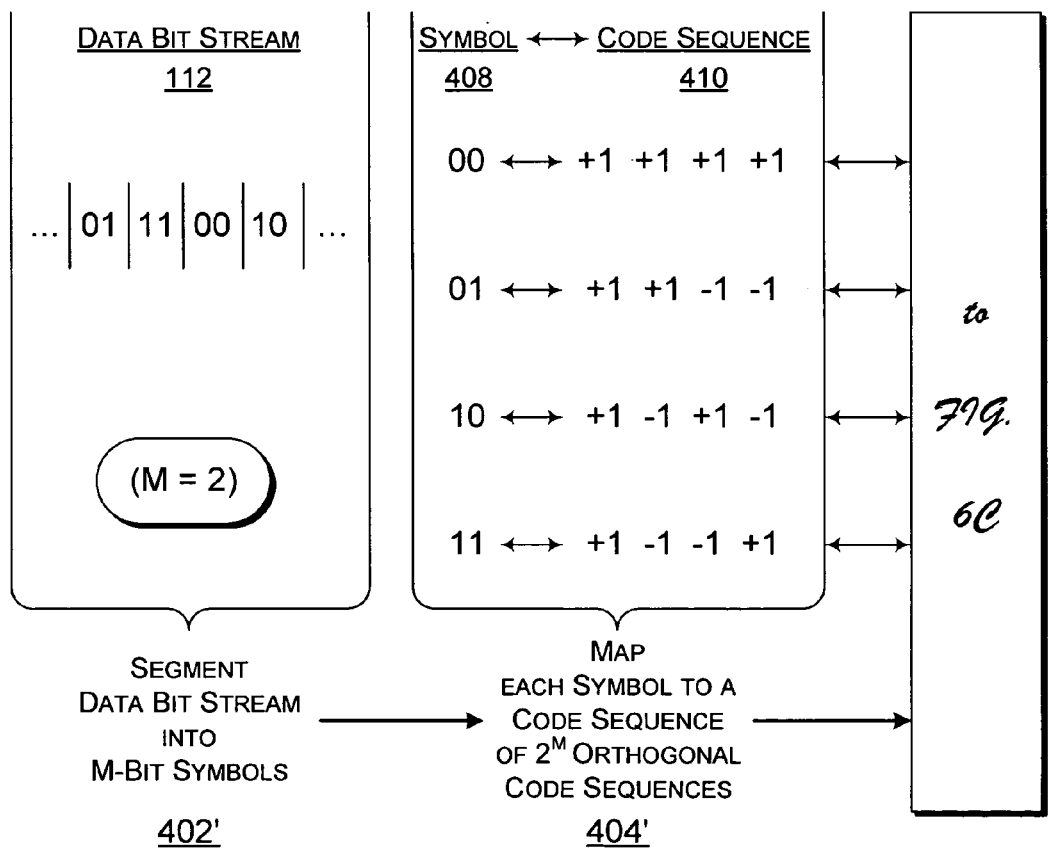
FIG. 4B illustrates an exemplary data-to-chip conversion for M-bit symbols in which M=2.

FIG. 4B illustrates an exemplary data-to-chip conversion 302' for M-bit symbols in which M=2. At phase 402', the data bit stream is segmented into M-bit symbols. In the illustrated example, data bit stream 112 is the following binary bit stream: " . . . 01110010 . . . ". With M=2 for 2-bit symbols, the binary bit stream 112 is segmented into the following four 2-bit symbols 408: 01, 11, 00, and 10.

At phase 404', each symbol is mapped to a code or chip sequence of $2^M$ orthogonal code sequences. Each symbol 408 is therefore mapped to one of four orthogonal code sequences 410. Each code sequence 410 includes $2^M$ characters that are either +1 or −1. In the illustrated example, the symbol "00" maps to the code sequence "+1 +1 +1 +1"; the symbol "01" maps to the code sequence "+1 +1 −1 −1"; the symbol "10" maps to the code sequence "+1 −1 +1 −1"; and the symbol "11" maps to the code sequence "+1 −1 −1 +1". As is apparent from this example, the illustrated code sequence set is orthogonal inasmuch as the sum of the products between the characters of any two code sequences 410 equals zero (0). These code sequences 410 are transformed into chip waveforms (e.g., chip waveforms 608 of FIG. 6C) during the pulse shaping of pulse shaper 306, as is described further below with particular reference to FIGS. 6A-6C.

Figure 5A:
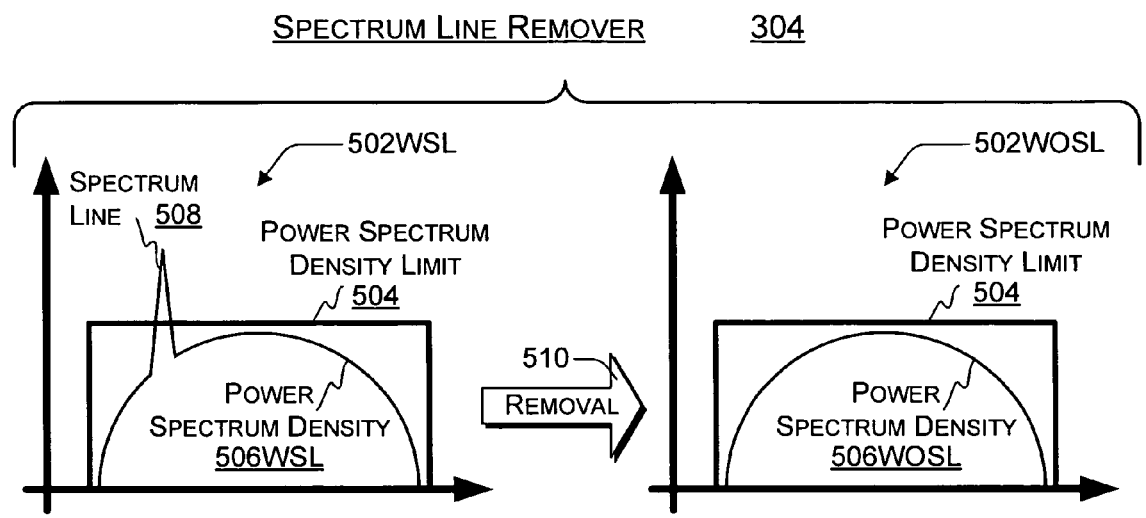
FIG. 5A illustrates an exemplary spectrum line removal by a spectrum line remover.

FIG. 5A illustrates an exemplary spectrum line removal 510 by a spectrum line remover 304. Two graphs 502 are shown: a graph with a spectrum line 502WSL and a graph without a spectrum line 502WOSL. As noted above, devices 102 (of FIG. 1) may operate in an environment under which there is a power spectrum density (PSD) limit 504. This power spectrum density limit 504 is indicated in both the graph with a spectrum line 502WSL and the graph without a spectrum line 502WOSL.

In the graph with a spectrum line 502WSL, a power spectrum density 506WSL with a spectrum line 508 is plotted. Because of spectrum line 508, power spectrum density 506WSL fails to meet power spectrum density limit 504. The entire power spectrum density 506WSL may be reduced in order to bring the spectrum line 508 spike into compliance with the constraints of power spectrum density limit 504. However, such an approach reduces the entirety of the transmitted power.

Instead, in a described implementation, a removal process 510 that is effectuated by spectrum line remover 304 removes spectrum line 508 from power spectrum density 506WSL to yield a power spectrum density 506WOSL without a spectrum line. As illustrated in the graph without a spectrum line 502WOSL, power spectrum density 506WOSL lacks a spectrum line due to removal process 510. Consequently, power spectrum density 506WOSL occupies a significant portion of power spectrum density limit 504 without exceeding/violating the limit.

Figure 5B:
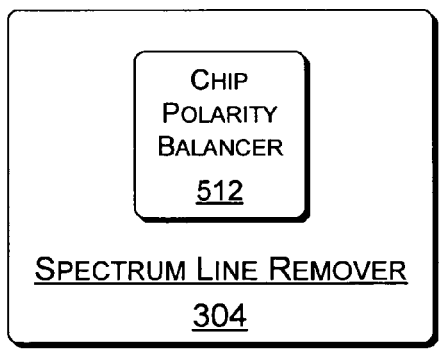
FIG. 5B is an exemplary spectrum line remover having a chip polarity balancer.

FIG. 5B is an exemplary spectrum line remover 304 having a chip polarity balancer 512. In other words, spectrum line remover 304 may be realized with a chip polarity balancer 512. Chip polarity balancer 512 balances chips having a positive polarity with chips having a negative polarity across symbols 408 and/or chip waveforms generated therefrom. For example, chip polarity balancer 512 ensures that the polarities of individual member chips of code sequences 410 (of FIG. 4) and/or the chip waveforms generated therefrom (as illustrated in FIG. 6C) are at least approximately half positive and half negative over time. Balancing the sign values of individual characters of code sequences 410 smoothes the power spectrum density 506 to thereby remove spectrum line(s) 508.

Figure 5C:
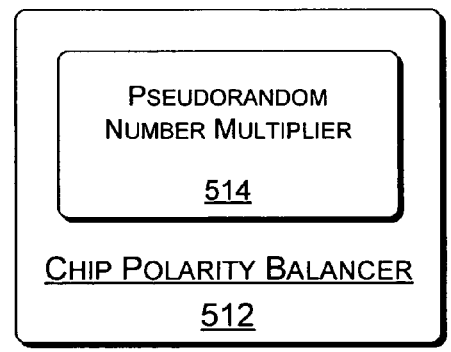
FIG. 5C is an exemplary chip polarity balancer having a pseudorandom number multiplier.

FIG. 5C is an exemplary chip polarity balancer 512 having a pseudorandom number multiplier 514. In order to balance chip polarities, pseudorandom number multiplier 514 multiplies each character of a mapped code sequence 410 by a pseudorandomly-selected +1 or −1. This produces a balance in the member chips of chip waveforms that are the transformation result from their corresponding code sequences 410, including the code sequence having the "+1 +1 +1 +1" character sequence or other code sequences having all "+1s", without destroying the orthogonality of the overall set of code sequences 410.

Figures 6A, 6B:
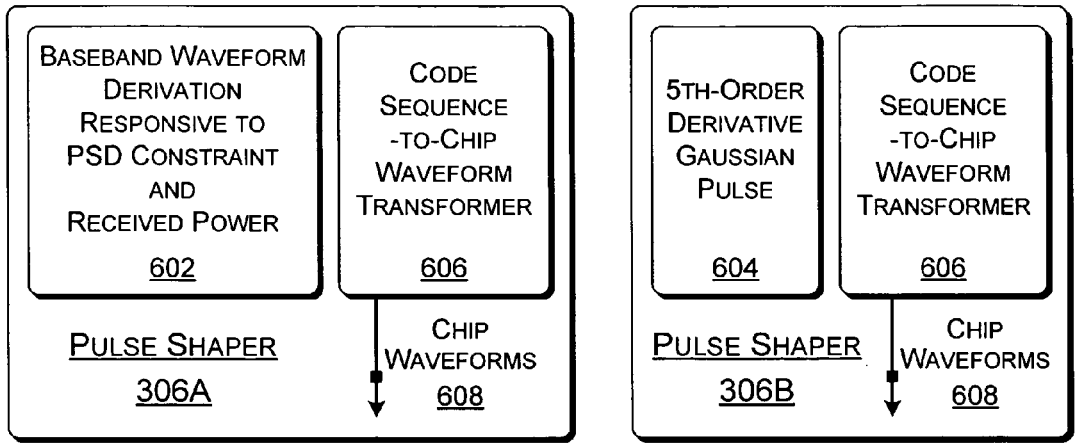
FIGS. 6A and 6B illustrate exemplary pulse shapers.
Figure 6C:
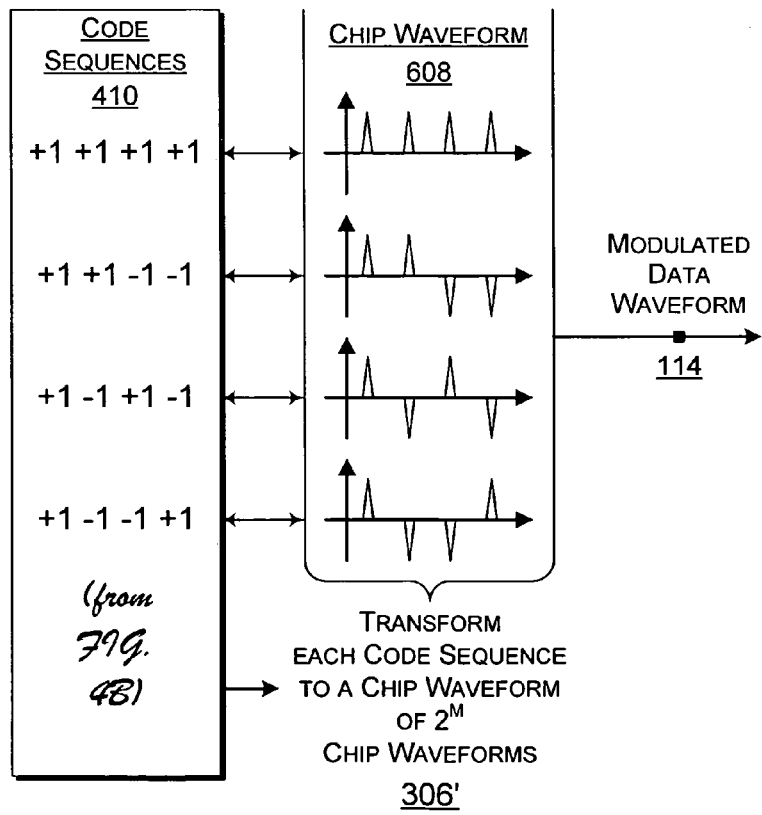
FIG. 6C illustrates an exemplary pulse shaping with chip waveforms for M-bit symbols in which M=2.

FIGS. 6A and 6B illustrate exemplary pulse shapers 306A and 306B, respectively. Generally, pulse shaper 306A shapes pulses in accordance with a baseband waveform that is derived responsive to a PSD constraint and a received power level, as indicated by block 602. More specifically, pulse shaper 306B shapes pulses in accordance with a baseband waveform that comports with a 5th-order derivative Gaussian pulse, as indicated by block 604. A quantitative description of an applicable exemplary $5^{th}$ order derivative Gaussian is described below in conjunction with the quantitative description of data-to-chip converter 302 and spectrum line remover 304.

Continuing with the qualitative description, pulse shapers 306A and 306B each include a code sequence-to-chip waveform transformer 606 as part of the pulse shaping process with the baseband waveform. Code sequence-to-chip waveform transformer 606 accepts as input each code sequence 410 from symbol-to-code sequence mapper 404 (of FIG. 4). Code sequence-to-chip waveform transformer 606 transforms each code sequence 410 into a corresponding chip waveform 608. The chip polarity in the corresponding chip waveform 608 includes/conveys/carries information contained in the code sequence 410 and therefore in the symbol 408. More specifically, sign information within a given code sequence 410 is perpetuated in a corresponding chip waveform 608 by polarities of individual chips thereof.

FIG. 6C illustrates an exemplary pulse shaping with chip waveforms 608 for M-bit symbols in which M=2. At phase 306', each code sequence is transformed into a chip waveform of $2^M$ different chip waveforms, and a modulated data waveform 114 is produced in conjunction with the pulse shaping. Each code sequence 410 from FIG. 4B is therefore transformed into one of four chip waveforms 608. In a described implementation, each chip waveform 608 includes $2^M$ chip members that have either a positive polarity or a negative polarity. Specifically, the code sequence "+1 +1 +1 +1" transforms into a chip waveform with four positive chips; the code sequence "+1 +1 −1 −1" transforms into a chip waveform with two positive chips followed by two negative chips; the code sequence "+1 −1 +1 −1" transforms into a chip waveform with a positive chip, followed by a negative chip, then another positive chip, and finally another negative chip; and the code sequence "+1 −1 −1 +1" transforms into a chip waveform with a positive chip, followed by two negative chips, and completed with a positive chip.

Consequently, sign values of respective characters in code sequences 410 are reflected in polarities of respective chip members in corresponding chip waveforms 608. For example, positive sign values of respective characters in code sequences 410 are reflected as positive polarities for respective chip elements in corresponding chip waveforms 608. Similarly, negative sign values of respective characters in code sequences 410 are reflected as negative polarities for respective chip elements in corresponding chip waveforms 608. Alternatively, this positive-to-positive and negative-to-negative reflection can be switched to positive-to-negative and negative-to-positive, respectively. In other words, positive sign values of respective characters in code sequences 410 may be reflected as negative polarities for respective chip elements in corresponding chip waveforms 608, and negative sign values of respective characters in code sequences 410 may be reflected as positive polarities for respective chip elements in corresponding chip waveforms 608.

In a described implementation, each chip comprises or is realized by a single pulse. However, two or more pulses may alternatively form each chip in a chip waveform 608. Regardless, the polarity of the chips, and thus the pulses, store/reflect/carry additional information present within a given corresponding symbol 408. Consequently, an individual data bit, even if by virtue of being part of an M-bit symbol, can be modulated using two or more chips having different polarities. Signals so modulated may be demodulated with regard to the pulse polarity of the pulses received in a wireless communication.

Thus, for data-to-chip conversion 302' (of FIG. 4B) and pulse shaping 306' jointly, a given code sequence 410 is transformed at phase 306' into a corresponding chip waveform 608. At phase 404', a particular symbol 408 was mapped to the given code sequence 410. Hence, the particular symbol 408 is associated with the chip waveform 608 corresponding to the given code sequence 410.

Quantitative Description of Orthogonal Pulse Polarity Modulation

A power efficient M-ary Orthogonal Pulse Polarity Modulation ($OP^2M$) using modified Orthogonal Variable Spreading Factor (OVSF) codes (e.g., a set of orthogonal Walsh codes) for time hopping ultra wideband (TH-UWB) communication systems is described quantitatively. The M-ary $OP^2M$ is applicable to both single-band and multi-band UWB systems.

In order to meet the FCC PSD mask for UWB systems, two techniques may be implemented. Firstly, the OVSF codes in the M-ary $OP^2M$ scheme may be modified to remove the PSD spectral lines. Secondly, by taking into account the frequency-dependent path loss and the FCC PSD mask, a tuned Gaussian pulse waveform that increases received signal power is derived for single-band UWB systems, and a root-raised-cosine pulse is provided for multi-band UWB systems.

Utilizing the spectral line removal as well as the tuned pulse shaping, a described M-ary $OP^2M$ scheme is more power efficient than (i) BPSK modulation schemes and (ii) binary and M-ary PPM schemes. According to analysis and simulation results, the gain can be more than 2-3 dB with a targeted uncoded BER of $10^{-3}$ in either an AWGN or multi-path channel for both single-band and multi-band UWB systems. This increased power efficiency of the M-ary $OP^2M$ scheme can be translated into range extension and/or higher throughput for UWB communication systems.

Signal Model for Single-Band UWB Modulation

Chip Waveform Conversion and Spectral Line Removal

In a described implementation, OVSF codes are employed in the modulation scheme. OVSF codes may be realized as a set of Walsh codes having M orthogonal M-chip code sequences in the $\log_2(M)$-th layer of the code tree. In an implementation of the described M-ary $OP^2M$ scheme, every $\log_2(M)$ bits comprise a symbol, and this symbol corresponds to a specific code sequence in the $\log_2(M)$-th layer of the OVSF code tree. Thus, in contrast to BPSK modulation schemes in which all of the pulses have the same polarity within a symbol, the pulse polarity may change within a symbol for $OP^2M$ schemes. The polarity of each chip in a given OVSF code sequence determines the polarity of a corresponding pulse.

To avoid spectral lines that violate the PSD, the mean value of signal chips is forced to be zero, which translates to a balance of +1 and −1 at the chip level. In a described implementation for M-ary $OP^2M$ schemes, this condition is satisfied for all of the OVSF codes except for the first one in each layer of the OVSF code tree. The first code in each layer has all the chips being positive ones (+1s).

To remove this deficiency in the original OVSF codes as applied to M-ary $OP^2M$, pseudorandom multiplication is applied. Specifically, after segmenting $\log_2(M)$ bits to compose a symbol and mapping the segmented symbol to an OVSF code sequence, the symbol is multiplied by an element of a long pseudorandom sequence. Because each element of the pseudorandom sequence has the value of +1 or −1 with equal probability, the transmitted signal has a balance of pulses for +1 and −1, at least on average. This multiplication modification manages to maintain the orthogonality between the symbols that have been mapped into code sequences but removes the spectrum lines.

At the transmitter side, let $$C_{M,I}^{OVSF}(J)$$

represent the J-th chip of the OVSF code sequence indexed by I in the $\log_2(M)$-th layer of the OVSF code tree where $0 \leq I \leq M-1$, $0 \leq J \leq M-1$ and $$C_{M,I}^{OVSF}(J) \in \{-1, 1\}.$$

Then, the signal of user k, which spans the whole time scale, is given by equation (1):

$$s^{(k)}(t) = \sum_{j=0}^{\infty} b_{\lfloor j/N_s \rfloor}^{(k)} C_{M,I_{\lfloor j/N_s \rfloor}^{(k)}}^{OVSF} (\lfloor (j \bmod N_s)/N_c \rfloor) w(t - jT_f - c_j^{(k)} T_c), \quad (1)$$

where $I_{\lfloor j/N_s \rfloor}^{(k)}$ denotes the code sequence index for the $\lfloor j/N_s \rfloor$-th symbol of user k; while $\lfloor x \rfloor$ denotes the integer part of x and $N_c$ is the number of pulses used to transmit a single chip of the OVSF code sequence which corresponds to an M-ary symbol. $N_s = N_c M$ is the number of pulses used to transmit a symbol, which includes M chips. Also, $b_i^{(k)}$ denotes the pseudorandom sequence element that is multiplied with the i-th symbol for user k.

The transmitted pulse shaping is denoted by w(t). The transmitted pulse shaping is tuned in the following section to increase (e.g., improve, maximize, etc.) the received power. $T_f$ is the frame time or pulse repetition time, which is typically tens or hundreds of times the pulse width. To avoid catastrophic collisions due to multiple access, the j-th pulse undergoes an additional shift of $c_j^{(k)} T_c$ seconds, where $c_j^{(k)}$ is a user-specific time shift pattern (termed the time-hopping sequence), and $T_c$ is the addressable time delay bin. The additional pulse shift $c_j^{(k)} T_c$ is less than the frame time to allow for the time required to read the output of a pulse correlator at the receiver. An exemplary receiver is described further below with reference to FIG. 7.

Without loss of generality, equation (1) above simplifies to equation (2) below for the first symbol of user k and with the number of pulses per chip set to one ($N_c = 1$). In this scenario, the signal can be simplified as equation (2):

$$s_{I^{(k)}}^{(k)}(t) = \sum_{j=0}^{M-1} b_0^{(k)} C_{M,I_0^{(k)}}^{OVSF}(j) w(t - jT_f - c_j^{(k)} T_c), \quad (2)$$

where $I_0^{(k)}$ stands for the index of the OVSF code sequence to which the first symbol of user k corresponds.

Demodulation of Orthogonal Pulse Polarity Modulation Signals at a Receiving Device At the receiver side, the received signal is correlated with the M possible OVSF code sequences, and the one that yields the maximum correlation value is selected as/determined to be the transmitted signal. It should be understood that although each symbol is multiplied by a pseudorandom sequence element at the transmitting device, the receiver can ignore this multiplication because it does not affect the amplitude of the correlator output due to the non-coherent detection.

Figure 7:
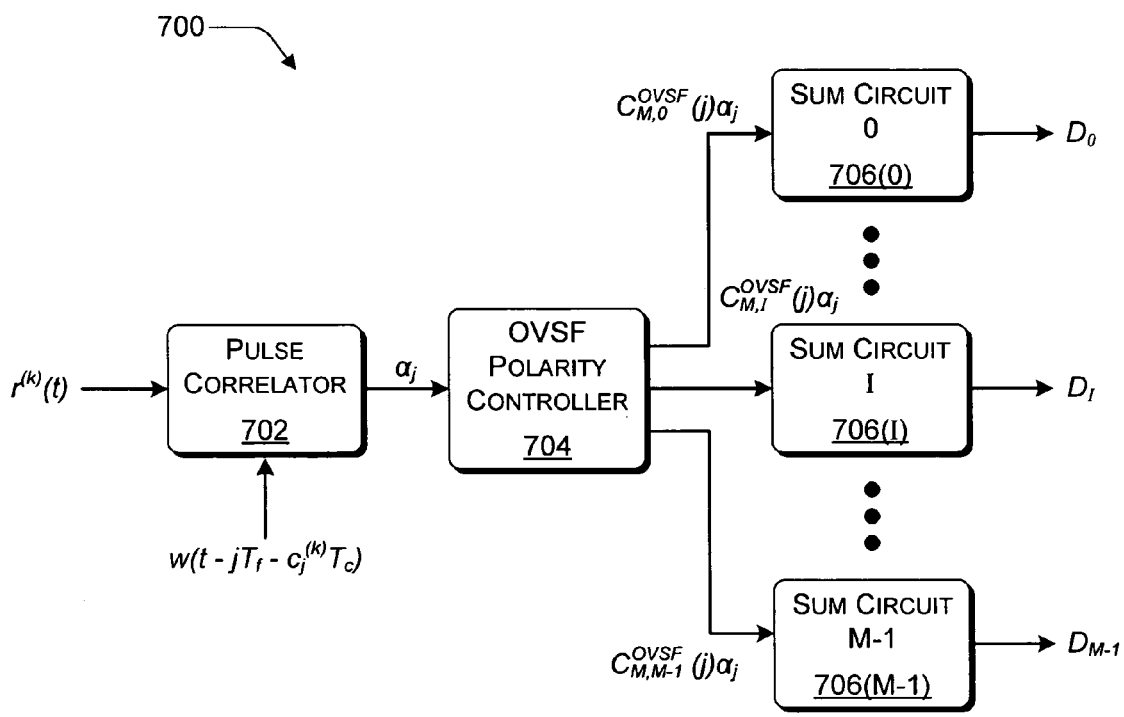
FIG. 7 illustrates an exemplary receiver architecture for orthogonal pulse polarity modulation.

FIG. 7 illustrates an exemplary receiver architecture 700 for orthogonal pulse polarity modulation. Receiver architecture 700 includes a pulse correlator 702, an OVSF polarity controller 704, and M summing circuits 706(0) . . . 706 (I) . . . 706(M-1). The received signal $r^{(k)}(t)$ is provided to pulse correlator 702. Pulse correlator 702 also accepts the transmitted pulse shaping waveform w(t). The correlation output $\alpha_j$ is forwarded to OVSF polarity controller 704 from pulse correlator 702.

OVSF polarity controller 704 modifies the correlation output $\alpha_j$ based on the currently indexed character (e.g., +/- sign) of each code sequence. Respective polarity modified correlation outputs are then provided to respective summing circuits 706. Summing circuits 706(0 . . . I . . . M-1) then sum respective series of respective polarity modified correlation outputs into possible data D ($D_0 \ldots D_I \ldots D_{M-1}$). The possible data D with the greatest magnitude is selected as/determined to be the correctly recovered data 112.

In other words, a correlator at each receiver branch can effectively be a sum of negative or positive outputs of the same pulse correlator when demodulating a signal transmitted using orthogonal pulse polarity modulation. Thus, receiver architecture 700 can be simplified (as illustrated in FIG. 7) because only one pulse waveform correlator 702 can accomplish demodulation, which yields tractable device complexity. As shown in FIG. 7, the i-th branch output of OVSF polarity controller 704 is a negative or positive version of the correlator output $\alpha_j$ based on the polarity of $$C_{M,i}^{OVSF}(j).$$

Pulse Shaping

The PSD constraint imposed by the FCC for UWB communications militates toward an appropriate choice for the baseband waveform w(t). In a described implementation, the baseband waveform w(t) is realized as a Gaussian pulse and derivatives thereof. More specifically, a $5^{th}$ order derivative Gaussian pulse is implemented as the baseband waveform w(t) for increasing the received power for single-band UWB systems. It is given by equation (3):

$$w(t) = \frac{A}{\sqrt{2\pi}} \left( -\frac{t^5}{\sigma^{11}} + \frac{10t^3}{\sigma^9} - \frac{15t}{\sigma^7} \right) \times \exp\left( -\frac{t^2}{2 \times \sigma^2} \right), \quad (3)$$

where A is a constant denoting the amplitude, t has the unit of nanoseconds, and $\sigma$ is the impulse width parameter. Because the FCC PSD mask is irregular in the sense that it lacks a closed-form expression, a tuned $\sigma$ is obtained numerically to achieve increased, if not maximum, received power under the FCC PSD limit by making the signal PSD below the FCC limit over the whole frequency band. An exemplary value for $\sigma$ for achieving this received power is 0.0645 nanoseconds. Although other values for $\sigma$ may alternatively be used, the following range for $\sigma$ also achieves good received power results: 0.055 to 0.065 nanoseconds.

Signal Model for Multiple-Band UWB Modulation

Chip Waveform Conversion and Spectral Line Removal

For a multi-band UWB system, the baseband pulses may be used to modulate the sinusoidal waveform of the center frequency in each sub-band. Thus, the M-ary OP²M scheme is extended and applied to the baseband pulse in each sub-band of multi-band UWB systems. Additionally, time-hopping may still be used as the multiple-access technique within each sub-band.

Consequently, the baseband signal format in a sub-band of a multi-band system is essentially similar to that of equations (1) and (2) above for a single-band system, except that a narrower pulse is replaced by a wider pulse waveform that is modulating a sinusoidal waveform at the center frequency of the sub-band of the multi-band system. Although the pulse width for multi-band is larger than that of the single-band waveform, a longer $T_f$ is required for multi-band UWB systems because the power of each sub-band is lower than that of the single-band case. This prevents, or at least mitigates, the degradation of the multiple access capability of time hopping.

A signal for M-ary OP²M scheme in a multi-band TH UWB system is therefore given by equation (4):

$$s^{(k)}(t) = \sum_{j=0}^{\infty} b^{(k)}_{\lfloor j/N_s \rfloor} C^{OVSF}_{M, I^{(k)}_{\lfloor j/N_s \rfloor}} (\lfloor (j \bmod N_s)/N_c \rfloor) \times \quad (4)$$

$$w(t - jT_f - c^{(k)}_j T_c) \times \cos(2\pi f_l t),$$

where $f_l$ is the center frequency of the l-th sub-band with $1 \leq l \leq K$ (with K being er of sub-bands).

The principles of receiver architecture 700 (of FIG. 7) as described herein above are also applicable to the demodulation of signals transmitted in multi-band UWB systems.

Pulse Shaping

For multi-band UWB systems, a pulse is used to modulate a carrier in each sub-band. A root-raised-cosine baseband pulse shape is used, and the baseband pulse is given by equation (5):

$$w(t) = \frac{\sin[(1-\alpha)\pi t/T] + 4\alpha(t/T)\cos[(1+\alpha)\pi t/T]}{(\pi t/T)[1-(4\alpha t/T)^2]}, \quad (5)$$

where $\alpha$ is the roll-off factor. Although other values for $\alpha$ and T may alternatively be used, $\alpha$ may be in the range of 0.2-0.5, and T may be determined by $T=(1+\alpha)/BW$ with BW indicating the bandwidth of each sub-band.

Exemplary Realization of a Device for Orthogonal Pulse Polarity Modulation

The devices, actions, aspects, features, procedures, components, etc. of FIGS. 1-7 are illustrated in diagrams that are divided into multiple blocks or other portions. However, the order, interconnections, interrelationships, layout, etc. in which FIGS. 1-7 are described and/or shown is not intended to be construed as a limitation, and any number of the blocks or other portions can be modified, combined, rearranged, augmented, omitted, etc. in any manner to implement one or more systems, methods, devices, procedures, media, apparatuses, arrangements, etc. for orthogonal pulse polarity modulation implementations. Furthermore, although the description herein includes references to specific implementations (and the exemplary operating environment/device of FIG. 8 below), the illustrated and/or described implementations can be implemented in any suitable analog components, hardware, software, firmware, or combination thereof and using any suitable device architecture(s), wireless network protocol(s), pulse production mechanism(s), wireless air interface(s), and so forth.

Figure 8:
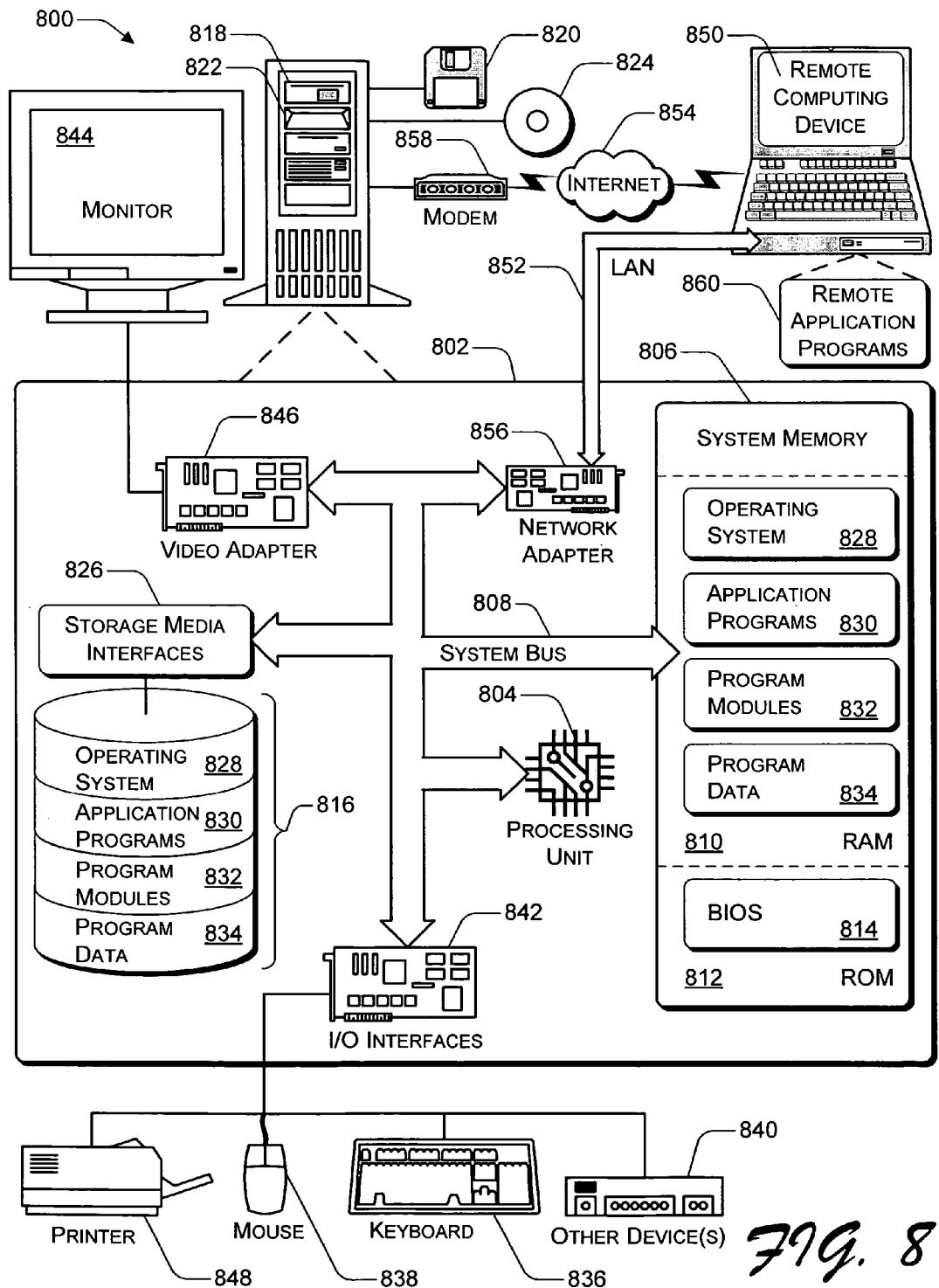
FIG. 8 illustrates an exemplary computing (or general device) operating environment that is capable of (wholly or partially) implementing at least one aspect of orthogonal pulse polarity modulation as described herein.

FIG. 8 illustrates an exemplary computing (or general device) operating environment 800 that is capable of (fully or partially) implementing at least one system, device, apparatus, component, arrangement, approach, method, procedure, media, some combination thereof, etc. for orthogonal pulse polarity modulation implementations as described herein. Operating environment 800 may be utilized in the computer and network architectures described below.

Exemplary operating environment 800 is only one example of an environment and is not intended to suggest any limitation as to the scope of use or functionality of the applicable device (including computer, network node, entertainment device, mobile appliance, general electronic device, etc.) architectures. Neither should operating environment 800 (or the devices thereof) be interpreted as having any dependency or requirement relating to any one or to any combination of components as illustrated in FIG. 8.

Additionally, orthogonal pulse polarity modulation implementations may be realized with numerous other general purpose or special purpose device (including computing or wireless system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, wired or wireless network nodes (including general or specialized routers), distributed or multi-processing computing environments that include any of the above systems or devices, some combination thereof, and so forth.

Realizations for orthogonal pulse polarity modulation implementations may be described in the general context of processor-executable instructions. Generally, processor-executable instructions include routines, programs, modules, protocols, objects, interfaces, components, data structures, etc. that perform and/or enable particular tasks and/or implement particular abstract data types. Orthogonal pulse polarity modulation implementations, as described in certain embodiments herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 800 includes a general-purpose computing device in the form of a computer 802, which may comprise any (e.g., electronic) device with computing/processing capabilities. The components of computer 802 may include, but are not limited to, one or more processors or processing units 804, a system memory 806, and a system bus 808 that couples various system components including processor 804 to system memory 806.

Processors 804 are not limited by the materials from which they are formed or the processing mechanisms employed therein. For example, processors 804 may be comprised of semiconductor(s) and/or transistors (e.g., electronic integrated circuits (ICs)). In such a context, processor-executable instructions may be electronically-executable instructions.

Alternatively, the mechanisms of or for processors 804, and thus of or for computer 802, may include, but are not limited to, quantum computing, optical computing, mechanical computing (e.g., using nanotechnology), and so forth.

System bus 808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of processor-accessible media. Such media may be any available media that is accessible by computer 802 or another (e.g., electronic) device, and it includes both volatile and non-volatile media, removable and non-removable media, and storage and transmission media.

System memory 806 includes processor-accessible storage media in the form of volatile memory, such as random access memory (RAM) 840, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated processor-accessible media provide non-volatile storage of processor-executable instructions, such as data structures, program modules, and other data for computer 802. Although exemplary computer 802 illustrates a hard disk 816, a removable magnetic disk 820, and a removable optical disk 824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 800.

Any number of program modules (or other units or sets of instructions/code) may be stored on hard disk 816, magnetic disk 820, optical disk 824, ROM 812, and/or RAM 840, including by way of general example, an operating system 828, one or more application programs 830, other program modules 832, and program data 834. Such instructions may include module(s) for joining and/or participating in a wireless network, module(s) for modulating and/or demodulating signals in accordance with orthogonal pulse polarity modulation scheme(s), and so forth.

A user may enter commands and/or information into computer 802 via input devices such as a keyboard 836 and a pointing device 838 (e.g., a "mouse"). Other input devices 840 (not shown specifically) may include a microphone, joystick, game pad, satellite dish, serial port, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 or 802.15 or other general wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and the performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media, along with propagation channels.

When implemented in a LAN networking environment, computer 802 is usually connected to LAN 852 via a network interface or adapter 856. When implemented in a WAN networking environment, computer 802 typically includes a modem 858 or other component for establishing communications over WAN 854. Modem 858, which may be internal or external to computer 802, may be connected to system bus 808 via input/output interfaces 842 or any other appropriate mechanism(s). It is to be appreciated that the illustrated network connections are exemplary and that other manners for establishing communication link(s), including wireless link(s) with tranceivers, between computers 802 and 850 may be employed.

In a networked environment, such as that illustrated with operating environment 800, program modules or other instructions that are depicted relative to computer 802, or portions thereof, may be fully or partially stored in a remote media storage device. By way of example, remote application programs 860 reside on a memory component of remote computer 850 but may be usable or otherwise accessible via computer 802. Also, for purposes of illustration, application programs 830 and other processor-executable instructions such as operating system 828 are illustrated herein as discrete blocks, but it is recognized that such programs, components, and other instructions reside at various times in different storage components of computing device 802 (and/or remote computing device 850) and are executed by processor(s) 804 of computer 802 (and/or those of remote computing device 850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A device comprising:
   one or more processors;
   one or more computer-readable storage media comprising data signal modulation logic executable on the one or more processors to: modulate data using orthogonal code sequences to convert the data into chip waveforms having chip polarity information that encodes sign value information from the orthogonal code sequences; and
   a transceiver to transmit a wireless signal carrying the modulated data to another device;
   wherein the data signal modulation logic is further adapted to:
      modulate the data using a pulse-shaping baseband waveform that is derived based on a frequency-dependent path loss and a power spectrum density constraint to create a more power efficient pulse, wherein the pulse-shaping baseband waveform comprises:
         a fifth-order Gaussian derivative waveform for single-band ultra wideband (UWB) systems; and
         a root-raised-cosine waveform with a roll-off factor set between 0.2 and 0.5, inclusive, for multiband UWB systems; and
      modulate the data by removing at least one spectrum line from a power spectrum density of the wireless signal carrying the modulated data, wherein the at least one spectrum line is removed by the data signal modulation logic by balancing chip polarities of the chip waveforms;
      wherein sign value information for respective characters of the orthogonal code sequence is reflected in a corresponding chip waveform by chip polarities of respective individual chips of the corresponding chip waveform.

2. The device as recited in claim 1, wherein the data signal modulation logic is further adapted to balance chip polarities of the chip waveforms by multiplying characters of the orthogonal code sequences by pseudorandom numbers.

3. The device as recited in claim 1, wherein an impulse width parameter of the fifth-order Gaussian derivative waveform is set between 0.055 and 0.065 nanoseconds, inclusive.

4. The device as recited in claim 3, wherein the impulse width parameter of the fifth-order Gaussian derivative waveform is set to 0.0645 nanoseconds.

5. A device comprising:
   a transceiver that is capable of transmitting configured to transmit wireless communications from the device;
   a processor; and
   one or more computer-readable storage media including data signal modulation logic that is at least partially executable by the processor, the data signal modulation logic configured to remove at least one spectrum line in a power spectrum density of a data signal to be transmitted from the device and to another device via the transceiver by balancing chip polarities in chip waveforms created for transmission of the data signal, such that a number of positive chip polarities in the chip waveforms is approximately equal to a number of negative chip polarities over time;
   wherein the data signal modulation logic is also configured to: (i) modulate the data signal to be transmitted from the device to the another device using chip waveforms having pulses with positive and negative polarities that are set responsive to positive and negative sign values of corresponding code sequences, and (ii) modulate the data using a pulse-shaping baseband waveform that is derived based on a frequency-dependent path loss and a power spectrum density constraint to create a more power efficient pulse, wherein the pulse-shaping baseband waveform comprises a fifth-order Gaussian derivative waveform for single-band ultra wideband (UWB) systems and a root-raised- cosine waveform with a roll-off factor set between 0.2 and 0.5, inclusive, for multi-band UWB systems.

6. The device as recited in claim 5, wherein the data signal modulation logic is further configured to remove the at least one spectrum line in the power spectrum density of the data signal by multiplying a pseudorandom number sequence with code sequences corresponding to the chip waveforms.

7. The device as recited in claim 6, wherein pseudorandom numbers of the pseudorandom number sequence that are multiplied with the code sequences are selected from a group comprising "+1" and "−1".

8. The device as recited in claim 5, wherein the data signal modulation logic is comprised of one or more of at least one analog component, hardware, software, or firmware.

9. One or more computer-readable storage media comprising processor-executable instructions that, when executed by one or more processors, direct a computing device to perform actions comprising:
   segmenting a data bit stream into multiple symbols;
   mapping the segmented symbols into multiple corresponding code sequences;
   transforming the mapped code sequences into corresponding chip waveforms in which chip polarities match sign values of the corresponding code sequences, wherein each sign value of the corresponding code sequences is reflected in the chip polarity of the corresponding chip waveform;
   removing at least one spectrum line from a data signal to be transmitted by balancing the chip polarities in the chip waveforms, such that a number of positive chip polarities is approximately equal to a number of negative chip polarities over time;

modulating the data signal to be transmitted using a pulse-shaping baseband waveform that is derived based on a power spectrum density constraint and frequency-dependent path loss to create a more power efficient pulse, wherein the pulse-shaping baseband waveform comprise a fifth-order Gaussian derivative waveform for single-band ultra wideband (UWB) systems and a root-raised-cosine waveform with a roll-off factor set between 0.2 and 0.5, inclusive, for multiband UWB systems.

10. The one or more computer-readable storage media as recited in claim 9, wherein the chip polarities match the sign values by positive chip polarities matching positive sign values and negative chip polarities matching negative sign values.

11. The one or more computer-readable storage media as recited in claim 9, wherein the chip polarities match the sign values by positive chip polarities matching negative sign values and negative chip polarities matching positive sign values.

12. The one or more computer-readable storage media as recited in claim 9, wherein the corresponding code sequences are orthogonal to one another.

13. The one or more computer-readable storage media as recited in claim 9, wherein the action of removing comprises an action of:
    multiplying the multiple code sequences by a pseudorandom number sequence.

14. The one or more computer-readable storage media as recited in claim 9, wherein each chip of each chip waveform is realized as at least one pulse.

15. The one or more computer-readable storage media as recited in claim 14, comprising the processor-executable instructions that, when executed, direct the device to perform a further action comprising:
    shaping the at least one pulse of each chip using the pulse-shaping baseband waveform that comprises the fifth-order Gaussian derivative.

16. The one or more computer-readable storage media as recited in claim 15, wherein the action of shaping comprises an action of:
    shaping the at least one pulse of each chip using the pulse-shaping baseband waveform that comprises the fifth-order Gaussian derivative in which an impulse width parameter of the fifth-order Gaussian derivative is set between 0.055 and 0.065 nanoseconds, inclusive.

17. The one or more processor-accessible media as recited in claim 9, wherein the one or more processor-accessible media comprise at least one of (i) one or more storage media or (ii) one or more transmission media.

18. An arrangement for orthogonal pulse polarity modulation, comprising:
    conversion means for converting data to code sequences;
    shaping means for shaping pulses forming chips of chip waveforms used in transmission of the data as modulated, wherein the data is modulated using a pulse-shaping baseband waveform that is derived based on a power spectrum density constraint and a frequency-dependent path loss to create a more power efficient pulse, wherein the pulse-shaping baseband waveform comprises a fifth-order Gaussian derivative waveform for single-band ultra wideband (UWB) systems a root-raised-cosine waveform with a roll-off factor set between 0.2 and 0.5, inclusive, for multiband UWB systems; and
    removal means for removing spectrum lines from a power spectrum density of the transmission of the modulated data;
    wherein chip polarities within a given chip waveform vary in accordance with sign values of a corresponding code sequence and each sign value of a corresponding code sequence is reflected in the chip polarity of the corresponding chip waveform; and
    wherein the removal means comprises balance means for balancing chip polarities of each chip waveform, such that a number of positive chip polarities is approximately equal to a number of negative chip polarities over time.

19. The arrangement as recited in claim 18, further comprising:
    transceiver means for transmitting without spectrum lines the modulated data using the shaped pulses.

20. The arrangement as recited in claim 18, wherein the conversion means comprises:
    segmentation means for segmenting the data into M-bit symbols.

21. The arrangement as recited in claim 20, wherein the conversion means further comprises:
    map means for mapping the M-bit symbols to corresponding code sequences of a set of $2^M$ code sequences.

22. The arrangement as recited in claim 18, wherein the shaping means further comprises:
    transformation means for transforming the code sequences into corresponding chip waveforms.

23. The arrangement as recited in claim 18, wherein the arrangement comprises at least one of (i) one or more processor-accessible media or (ii) at least one device.

* * * * *